United States Patent [19]
Takita

[11] Patent Number: 5,850,574
[45] Date of Patent: Dec. 15, 1998

[54] APPARATUS FOR VOICE ENCODING/ DECODING UTILIZING A CONTROL TO MINIMIZE A TIME REQUIRED UPON ENCODING/DECODING EACH SUBFRAME OF DATA ON THE BASIS OF WORD TRANSFER INFORMATION

[75] Inventor: Maho Takita, Ayase, Japan

[73] Assignee: Matsushita Electric Industrial Co., Ltd., Osaka, Japan

[21] Appl. No.: 781,793

[22] Filed: Jan. 10, 1997

[30] Foreign Application Priority Data

May 8, 1996 [JP] Japan .................................. 8-113974

[51] Int. Cl.⁶ ................................ G06F 5/00; G06F 1/06
[52] U.S. Cl. ......................... 395/889; 395/872; 395/878; 395/850; 341/110
[58] Field of Search ..................................... 395/889, 872, 395/878, 850; 704/222; 375/340; 365/189.02; 370/468; 711/167

[56] References Cited

U.S. PATENT DOCUMENTS

| | | |
|---|---|---|
| 4,527,233 | 7/1985 | Ambrosius, III et al. ............... 711/167 |
| 4,598,397 | 7/1986 | Nelson et al. ........................... 370/468 |
| 4,646,270 | 2/1987 | Voss ..................................... 365/189.02 |
| 5,465,274 | 11/1995 | Houlberg ................................. 375/340 |
| 5,473,727 | 12/1995 | Nishiguchi et al. .................... 704/222 |

FOREIGN PATENT DOCUMENTS 5-303397 11/1993 Japan .

Primary Examiner—Thomas C. Lee
Assistant Examiner—David Ton
Attorney, Agent, or Firm—Lowe Hauptman Gopstein Gilman & Berner

[57] ABSTRACT

A voice encoding/decoding apparatus has a data buffer holding voice data and encoded data, a decoding process unit which receives the voice data of one subframe from the data buffer to decodes the same and outputs obtained encoded data of one subframe to the data buffer, a decoding process unit which receives the encoded data of one subframe from the data buffer to decodes the same and outputs obtained voice data of one subframe to the data buffer, a frame synchronization detecting unit, a first clock generating unit providing timing of inputting/outputting the voice data to/from the data buffer, a second clock generating unit providing timing of inputting/outputting the encoded data to/from the data buffer, a word transfer information providing unit providing the number of words of the voice data and the number of words of the encoded data to be inputted/outputted to/from the data buffer, and information about positions of the voice data and the encoded data in the data buffer, and a control unit minimizing a time required from an inputting to an outputting of the data upon encoding and decoding the data of each subframe on the basis of the information provided by the word transfer information providing unit.

5 Claims, 13 Drawing Sheets

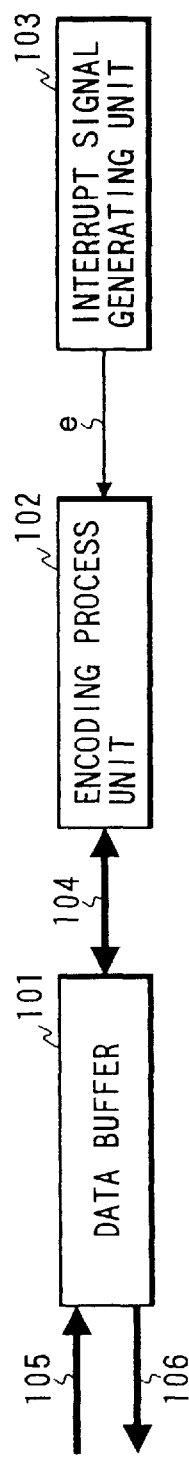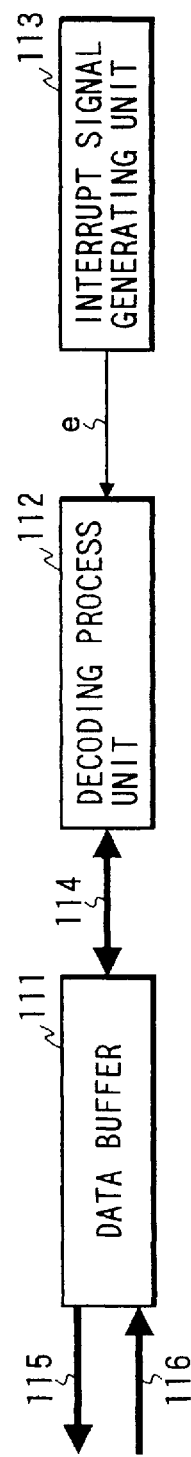

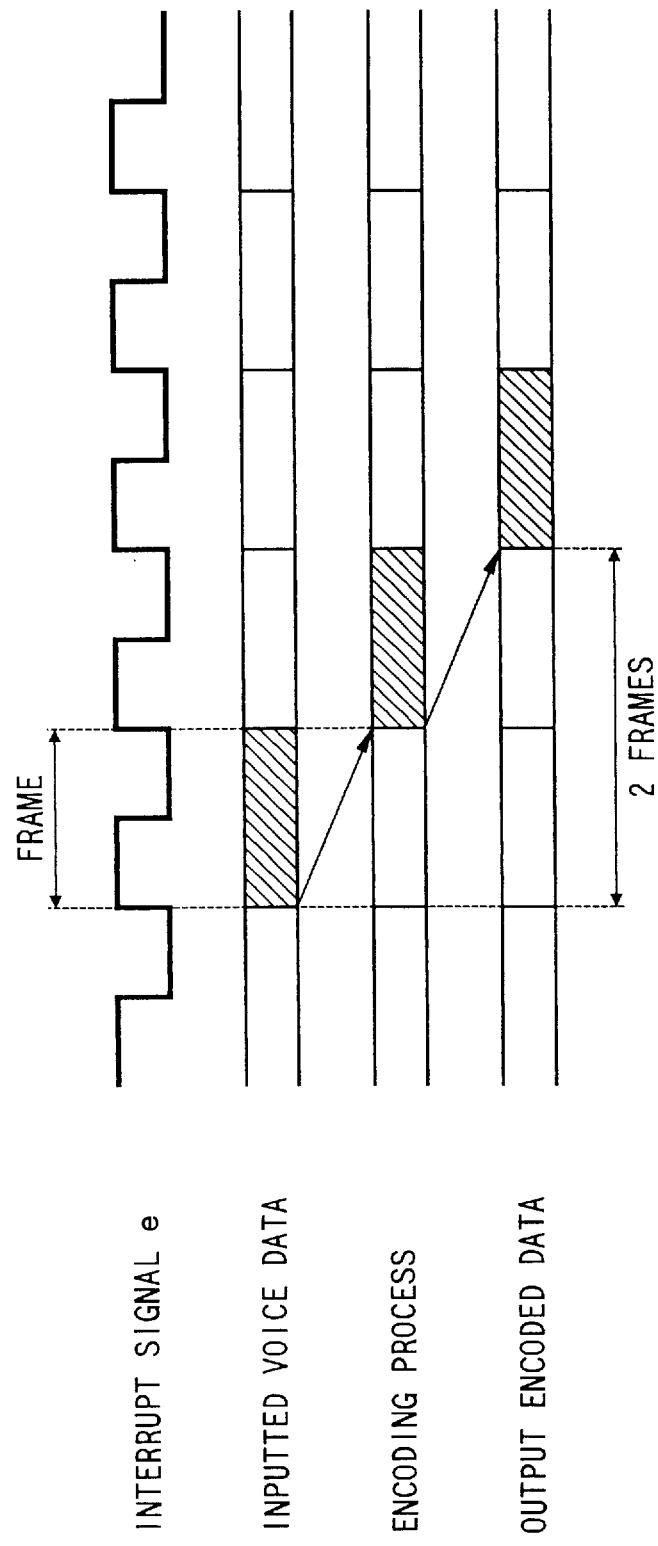

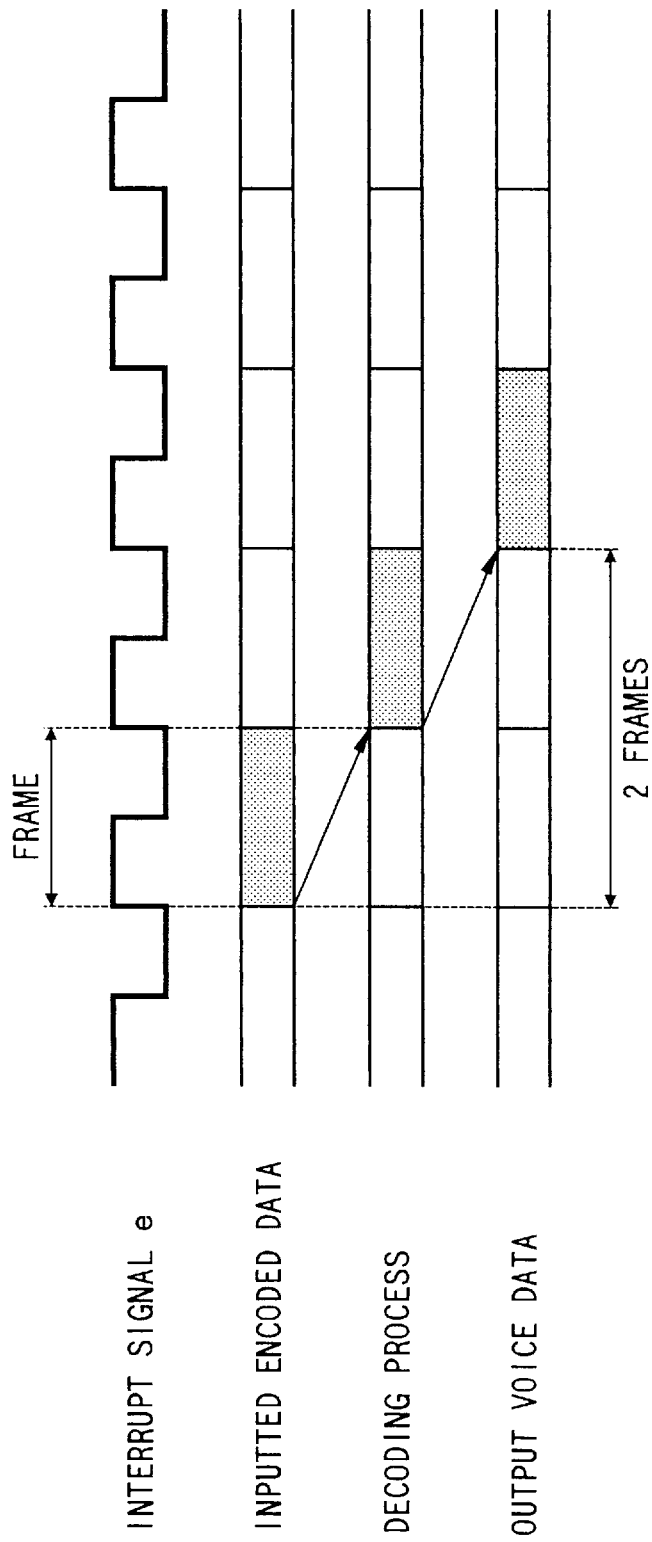

APPARATUS FOR VOICE ENCODING/ DECODING UTILIZING A CONTROL TO MINIMIZE A TIME REQUIRED UPON ENCODING/DECODING EACH SUBFRAME OF DATA ON THE BASIS OF WORD TRANSFER INFORMATION

BACKGROUND OF THE INVENTION (1) Field of the Invention

The present invention relates to a voice encoding/ decoding apparatus which controls timing so as to minimize delay occurring when voice data is encoded or encoded data is decoded.

(2) Related Art

A technique of a voice encoding process for digitizing voice information and compressing the digitized data, and a technique of a voice decoding process for decompressing the compressed voice information have been put to practical use in these years.

FIG. 11 is a block diagram showing a general voice encoding apparatus. In FIG. 11, reference numeral 101 denotes a data buffer, 102 an encoding process unit, 103 an interrupt signal generating unit, 104 a data bus, 105 a first I/O port, 106 a second I/O port and e an interrupt signal. The voice encoding apparatus shown in FIG. 11 operates as follows.

In the voice encoding apparatus shown in FIG. 11, an interrupt signal e having a frame cycle is outputted from the interrupt signal generating unit 103 to the encoding process unit 12. In synchronization with the interrupt signal e, voice data is inputted by word to the data buffer 101 via the first I/O port 105 when the inputted voice data is encoded and outputted as encoded data. The encoding process unit 102 receives the voice data via the data bus 104, encodes the voice data in synchronization with the interrupt signal e, then outputs the encoded voice data to the data buffer 101 via the data bus 104. The encoded voice data held in the data buffer 101 is outputted by word to the outside via the second I/O port 106.

FIG. 12 a timing chart of the above voice encoding apparatus. Timing of an operation of the above encoding apparatus is as follows. First, the voice data of one frame is inputted to the data buffer 101 during one cycle of the interrupt signal e. The voice data is encoded during the next cycle of the interrupt signal e to be encoded data, and successively outputted to the data buffer 101. The encoded data held in the data buffer 101 is outputted to the outside during the third cycle of the interrupt signal e. Accordingly, delay occurring until the inputted voice data is outputted as the encoded voice data is 2 frames.

FIG. 13 is a block diagram showing a general voice decoding apparatus. In FIG. 13, reference numeral 111 denotes a data buffer, 112 a decoding process unit, 113 an interrupt signal generating unit, 114 a data bus, 115 a first I/O port, 116 a second I/O port, and e an interrupt signal. The above general voice decoding apparatus operates as follows.

The interrupt signal e having a frame cycle is outputted from the interrupt signal generating unit 113 to the decoding process unit 112. In synchronization with the interrupt signal e, encoded data is inputted by word to the data buffer 111 via the second I/O port 116 when the encoded data is decoded and outputted as voice data. The decoding process unit 112 receives the encoded data via the data bus 114, decodes the encoded data in synchronization with the interrupt signal e, then outputs the decoded voice data to the data buffer 111 via the data bus 114. The voice data held in the data buffer 111 is outputted by word to the outside via the first I/O port 115.

FIG. 14 is a timing chart of the above voice decoding apparatus. Now, timing of an operation of the above voice decoding apparatus will be described. First, encoded data of one frame is inputted to the data buffer 111 during one cycle of the interrupt signal e. The encoded voice data is decoded during the next cycle of the interrupt signal e to be decoded data, and successively outputted to the data buffer 111. The decoded voice data held in the data buffer 111 is outputted to the outside during the third cycle of the interrupt signal e. In consequence, delay occurring until the inputted encoded data is outputted as voice data is 2 frames.

From the above, it is known that delay occurring in the encoding and decoding processes totals 4 frames.

As above, the above general method has a drawback that delay occurring in the encoding/decoding process is large since a process conducted on data of one frame should be in synchronization with the interruption signal besides the data is inputted and outputted in each frame cycle.

In the light of the above drawback, an object of the present invention is to provide a voice encoding/decoding apparatus which can largely decrease delay occurring in encoding and decoding processes.

SUMMARY OF THE INVENTION

To overcome the above problem, a frame is divided into plural subframes (s frames, for example, where s is a positive integer) and data is inputted and outputted in a by subframe as a unit. A time to commence an encoding process and a decoding process is determined by managing the number of data inputted to and outputted from the data buffer and the data is outputted immediately after completion of the process conducted on data of one subframe. As a result, it is possible to largely decrease delay occurring in the encoding process and decoding process.

BRIEF DESCRIPTION OF THE DRAWINGS

FIG. 11 is a block diagram showing a structure of a general voice encoding apparatus;

FIG. 12 is a timing chart of the general voice encoding apparatus;

FIG. 13 is a block diagram showing a structure of a general voice decoding apparatus; and FIG. 14 is a timing chart of the general voice decoding apparatus.

Figure 1:
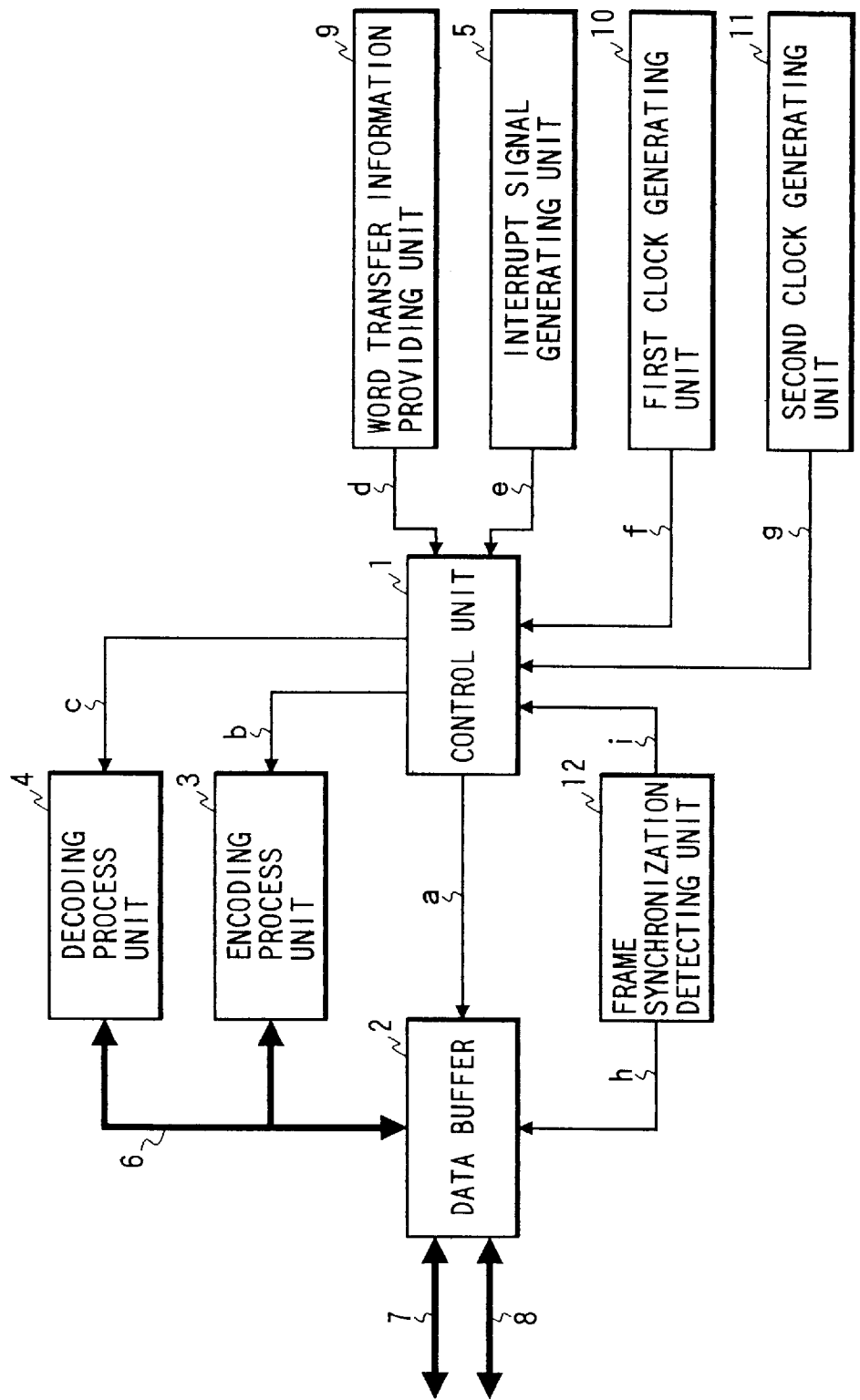
FIG. 1 is a block diagram showing a structure of a voice encoding/decoding apparatus according to a first embodiment of this invention.

DETAILED DESCRIPTION OF THE INVENTION (1) Description of Aspects of the Invention As a first aspect of this invention, a voice encoding/decoding apparatus having a data buffer for holding voice data inputted and outputted through an I/O port and encoded data inputted and outputted through another I/O port, a voice encoding means receiving the voice data of one subframe from the data buffer to encode the voice data to obtain encoded data and outputting the encoded data of one subframe to the data buffer, a voice decoding means receiving the encoded data of one subframe from the data buffer to decode the encoded data to obtain voice data and outputting the voice data of one subframe to the data buffer, a frame synchronization detecting means for detecting a position of a synch bit attached to the encoded data held in the data buffer, a first clock generating means for providing timing of inputting and outputting the voice data to and from the data buffer, a second clock generating means for providing timing of inputting and outputting the encoded data to and from the data buffer, a word transfer information providing means for providing the number of words of the voice data to be inputted to and outputted from the data buffer, the number of words of the encoded data to be inputted to and outputted from the data buffer, information about a position of the voice data in the data buffer and information about a position of the encoded data in the data buffer, and a control means for minimizing a time required from an inputting of the voice data to an outputting of the encoded data upon encoding the voice data of each subframe and a time required from an inputting of the encoded data to an outputting of the voice data upon decoding the encoded data of each subframe on the basis of the information provided by the word transfer information providing means. In the above voice encoding/decoding apparatus, a frame is divided into plural subframes (e.g., s subframes) and data is inputted and outputted by subframe as a unit to be processes at a time, whereby a time to commence an encoding process and a decoding process is determined by managing the number of data to be inputted to and outputted from the data buffer. If a synch bit is added to the encoded data, it is possible to vary a size of a subframe to be decoded obtained when an interruption occurs such as to minimize delay occurring in the decoding process while keeping the synchronization. The data is outputted immediately after completion of the encoding process and the decoding process conducted on one subframe, whereby the delay occurring in the encoding process and the decoding process may be largely decreased.

As a second aspect of this invention, a voice encoding/decoding apparatus has a data buffer for holding voice data inputted and outputted through an I/O port and encoded data inputted and outputted through another I/O port, a voice encoding means receiving the voice data of one subframe from the data buffer to encode the voice data to obtain encoded data and outputting the encoded data of one subframe to the data buffer, a voice decoding means receiving the encoded data of one subframe from the data buffer to decode the encoded data to obtain voice data and outputting the voice data of one subframe to the data buffer, a first clock generating means for providing timing of inputting and outputting the voice data to and from the data buffer, a second clock generating means for providing timing of inputting and outputting the encoded data to and from the data buffer, a word transfer information providing means for providing the number of words of the voice data to be inputted to and outputted from the data buffer, the number of words of the encoded data to be inputted to and outputted from the data buffer, information about a position of the voice data in the data buffer and information about a position of the encoded data in the data buffer, and a control means for minimizing a time required from an inputting the voice data to an outputting of the encoded data upon encoding the voice data of each subframe and a time required from an inputting of the encoded data to an outputting of the voice data upon decoding the voice data of each subframe on the basis of the information provided by the word transfer information providing means. In the above voice encoding/decoding apparatus, one frame is divided into plural subframes (e.g., s subframes) and data is inputted and outputted by subframe as a unit to be processed at a time, whereby a time to commence the encoding process and the decoding process by managing the number of data inputted to and outputted from the data buffer. The data is outputted immediately after completion of the encoding process and the decoding process conducted on each subframe so that the delay occurring in the encoding and decoding processes may be largely decreased.

As a third aspect of this invention, a voice encoding apparatus has a data buffer for holding voice data inputted through an I/O port and encoded data outputted through another I/O port, a voice encoding means receiving the voice data of one subframe from the data buffer to encode the voice data to obtain encoded data and outputting the encoded data of one subframe to the data buffer, a first clock generating means for providing timing of inputting the voice data to the data buffer, a second clock generating means for providing timing of outputting the encoded data from the data buffer, a word transfer information providing means for providing the number of words of the voice data to be inputted to the data buffer, the number of words of the encoded data to be outputted from the data buffer, information about a position of the voice data in the data buffer and information about a position of the encoded data in the data buffer, and a control means for minimizing a time required from an inputting of the voice data from an outputting of the encoded data upon encoding the voice data of each subframe on the basis of the information provided by the word transfer information providing means. In the above voice encoding apparatus, a frame is divided into plural subframes (e.g., s subframes) and data is inputted to and outputted from the data buffer by subframe as a unit to be processed at a time. A time to commence the encoding process is determined by managing the number of data to be inputted to and outputted from the data buffer. The data is outputted immediately after completion of the encoding process conducted on each subframe so that the delay occurring in the encoding process may be largely decreased.

As a fourth aspect of this invention, a voice decoding apparatus has a data buffer holding voice data to be outputted through an I/O port and encoded data inputted through another I/O port, a voice decoding means receiving the encoded data of one subframe from the data buffer to decode the encoded data of one subframe to obtain the voice data and outputting the voice data of one subframe to the data buffer, a first clock generating means for providing timing of outputting the voice data from the data buffer, a second clock generating means for providing timing of inputting the encoded data to the data buffer, a word transfer information providing means for providing the number of words of the voice data to be outputted from the data buffer, the number of words of the encoded data to be inputted to the data buffer, information about a position of the voice data in the data buffer and information about a position of the encoded data in the data buffer, and a control means for minimizing a time required from an inputting of the encoded data to an outputting of the voice data upon decoding the encoded data of each subframe on the basis of the information provided by the word transfer information providing means. In the above voice decoding apparatus, a frame is divided into plural subframes (e.g., s subframes) and data is inputted to and outputted from the data buffer by subframe as a unit to be processed at a time. By managing the number of data inputted to and outputted from the data buffer, a time to commence the decoding process is determined. The data is outputted immediately after completion of the decoding process conducted on each subframe so that the delay occurring in the decoding process may be largely reduced.

As a fifth aspect of this invention, a voice decoding apparatus has a data buffer for holding voice data to be outputted through an I/O port and encoded data inputted through another I/O port, a voice decoding means receiving the encoded data of one subframe from the data buffer to decode the encoded data to obtain the voice data and outputting the voice data of one subframe to the data buffer, a frame synchronization detecting means for detecting a position of a synch bit in the encoded data held in the data buffer, a first clock generating means for providing timing of outputting the voice data from the data buffer, a second clock generating means for providing timing of inputting the encoded data to the data buffer, a word transfer information providing means for providing the number of words of the voice data to be outputted from the data buffer, the number of words of the encoded data to be inputted to the data buffer, information about a position of the voice data in the data buffer and information about a position of the encoded data in the data buffer, and a control means for minimizing a time required from an inputting of the encoded data to an outputting of the voice data upon decoding the voice data of each subframe on the basis of the information provided by the word transfer information providing means. In the above voice decoding apparatus, a frame is divided into plural subframes (e.g., s subframes) and data is inputted to and outputted from the data buffer by subframe as a unit to be processed at a time. By managing the number of data inputted to and outputted from the data buffer, a time to commence the decoding process is determined. If a synch bit is added to the encoded data, it is possible to vary a size of a subframe to be decoded obtained when an interruption occurs such as to minimize delay occurring in the decoding process while keeping the synchronization. The data is outputted immediately after completion of the decoding process conducted on one subframe so that the delay occurring in the decoding process may be largely reduced.

(2) Description of Preferred Embodiments (a) Description of a First Embodiment

FIG. 1 is a block diagram showing a voice encoding/decoding apparatus according to a first embodiment of this invention. In FIG. 1, reference numeral 1 denotes a control unit, 2 a data buffer, 3 an encoding process unit, 4 a decoding process unit, 5 an interrupt signal generating unit, 6 a data bus, 7 a first I/O port, 8 a second I/O port, 9 a word transfer information providing unit, 10 a first clock generating unit, 11 a second clock generating unit, and 12 a frame synchro-nization detecting unit. Further, a denotes a data control signal, b an encoding process start signal, c a decoding process start signal, d word transfer information, e an interrupt signal, f a first clock signal, g a second clock signal, h a synch bit retrieve signal, and i synch bit position information. An operation of the voice encoding/decoding apparatus with the above structure will be described next.

According to this embodiment, a frame is divided into plural subframes (four subframes in this case) and data is inputted and outputted by subframe as a unit to be processed at a time in an encoding process or decoding process when inputted voice data is encoded and outputted as encoded data or inputted encoded data is decoded and outputted as voice data. The word transfer information providing unit 9 is set in advance therein the number of words contained in one subframe to be processed, and input/output transfer starting addresses of voice data and encoded data, and sends out the number of words and the addresses as the word transfer information d to the control unit 1.

Figure 2:
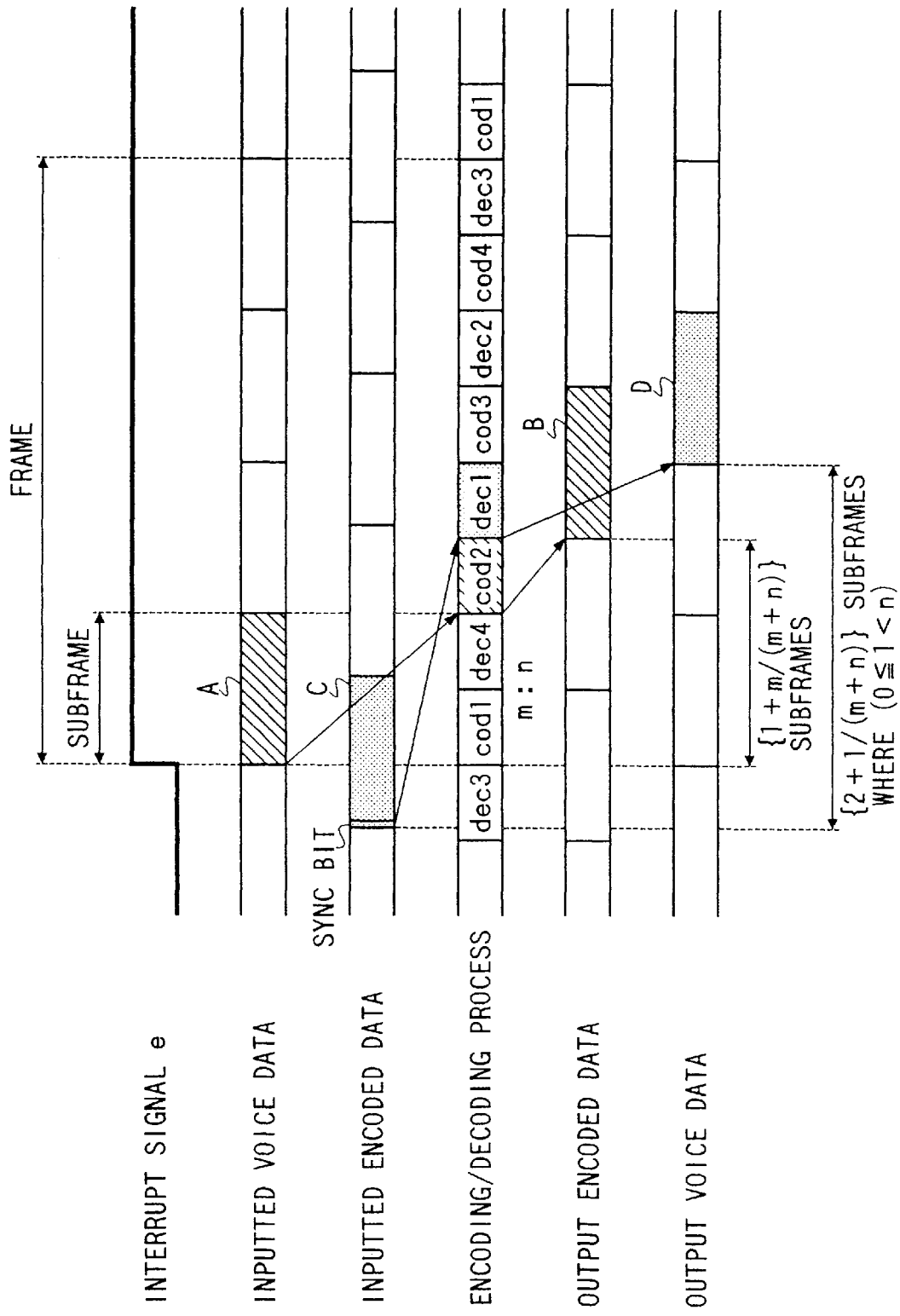
FIG. 2 is a timing chart of the voice encoding/decoding apparatus according to the first embodiment.

Next, the encoding process will be described. The control unit 1 counts a number of times voice data is inputted and outputted, outputs the encoding process start signal b to the encoding process unit 3 when the count number reaches the number of words designated in the word transfer information d, then resets the count number to continuously commence again the counting. The encoding process unit 3 encodes the voice data of one subframe when receiving the encoding process start signal b. The voice data equivalent to the words contained in one subframe stored at the voice data input transfer starting address and the following addresses is outputted from the data buffer 2 to the encoding process unit 3 via the data bus 6 according to the control signal a fed from the control unit 1. The encoding process unit 3 encodes the voice data of one subframe, outputs the encoded data equivalent to the words contained in one subframe to the data buffer 2 via the data bus 6, and stores the encoded data at an encoded data output transfer starting address and the following addresses in the data buffer 2 according to the control signal a fed from the control unit 1. The subframe encoding process conducted when an interruption occurs is given a number (cod1), as shown in FIG. 2. A synch bit is added to the encoded data only when an interruption occurs. After that, the order of the encoding process succeeds (cod2), (cod3), (cod4), (cod1), . . . (cod4), repeatedly.

Next, a decoding process will be described. The frame synchronization detecting unit 12 outputs the synch bit retrieve signal h to the data buffer 2, retrieves a synch bit from encoded data held in the data buffer 2, and outputs the synch bit position information i to the control unit 1. The control unit 1 selects a time to commence a decoding process on a subframe conducted at the time of occurrence of interruption on the basis of the synch bit position information i such that delay occurring in the decoding process is minimum, and re-arranges the inputted encoded data such that the synch bit positions at the decoded data input transfer starting address. The control unit 1 counts the number of times the encoded data is inputted and outputted, outputs the decoding process start signal c to the decoding process unit 4 when the count number reaches the number of words designated in the word transfer information d and resets the count number to continuously commence again the counting, The decoding process unit 4 decodes the encoded data of one subframe when receiving the decoding process start signal c. The encoded data equivalent to the words contained in one subframe that should be processed stored at the encoded data input transfer starting address and the following addresses is outputted to the decoding process unit 4 via the data bus 2 from the data buffer 2 according to the control signal a fed from the control signal 1. The decoding process unit 4 decodes the encoded data of one subframe, outputs decoded voice data equivalent to the words in one subframe obtained through the decoding process to the data buffer 2 via the data bus 6, and stores the decoded voice data at the voice data output transfer starting address and the following addresses in the data buffer 2. The order of the subframe decoding process begins with (dec1), during which data attached a synch bit thereto is processed, as shown in FIG. 2. Following that, the subframe decoding process succeeds (dec2), (dec3), (dec4), (dec1), . . . (dec4), repeatedly. A time to commence the subframe decoding process conducted when an interruption occurs is such selected according to a position of the synch bit that delay occurring in the decoding process is minimum so that a time to commence the subframe decoding process is independent of occurrence of the interruption.

In the above voice encoding/decoding apparatus, the data is inputted and outputted as follows. The voice data is successively inputted by word at timing of the first clock signal f fed from the first clock generating unit 10 with data to be stored at the voice data input transfer starting address in the lead to the data buffer 2 via the first I/O port 7 according to the control signal a fed from the control unit 1. At the same time, the voice data is successively outputted with data stored at the voice data output transfer starting address in the lead at timing of the first clock signal f from the data buffer 2 via the first I/O port 7 to the outside according to the control signal a fed from the control unit 1. When the voice data equivalent to the words contained in one subframe is completed to be inputted (or outputted), the voice data input transfer starting address (the voice data output transfer starting address) is again designated as an address to be accessed next by the control signal a. On the other hand, the encoded data is successively inputted by word at timing of the second clock signal g fed from the second clock generating unit 11 with data to be stored at the voice data input transfer starting address in the lead to the data buffer 2 via the second I/O port 8 according to the control signal a fed from the control unit 1. At the same time, the encoded data is successively outputted by word with data stored at the voice data output transfer starting address in the lead at timing of the second clock signal g from the data buffer 2 via the second I/O port 8 according to the control signal a fed from the control unit 1. When the encoded data equivalent to the words contained in one subframe is completed to be inputted (or outputted), the voice data input transfer starting address (or the voice data output transfer starting address) is again designated as an address to be accessed next by the control signal a.

FIG. 2 is a timing chart of the voice encoding/decoding apparatus shown in FIG. 1. Timing of the operation of the voice encoding/decoding apparatus will be described next. First, the encoding process will be described. Inputted voice data A of one subframe obtained immediately after a rising of the interrupt signal e is inputted to the data buffer 2. The inputted voice data A is encoded in an encoding process conducted during a cycle of the next subframe (cod2) following a cycle generated at the time of occurrence of the interruption, and encoded voice data is sequentially outputted to the data buffer 2. The encoded data held in the data buffer 2 is outputted as output encoded data B to the outside during a decoding process (dec1) immediately after an encoding process (cod2) and the next encoding process (cod3).

Next, the decoding process will be described. If a synch bit positions as shown in FIG. 2, inputted encoded data C of one subframe with the synch bit in the lead is inputted to the data buffer 2. The inputted encoded data C is decoded during the next subframe cycle (dec1) since it is impossible to catch a subframe cycle (dec4) generated immediately after occurrence of the interruption. During a cycle of the next subframe (dec1), data to which the synch bit is added is processed. Meanwhile, the decoding process conducted immediately after occurrence of the interruption is given a number (dec4). Voice data decoded in the decoding process (dec1) is successively outputted to the data buffer 2. The voice data held in the data buffer 2 is outputted as output voice data D during an encoding process (cod3) immediately after the decoding process (dec1) and the next decoding process (dec2).

According to this embodiment, if a time ratio of the encoding process to the decoding process conducted on one subframe is m:n, delay occurring until inputted voice data is outputted as encoded data is [1+m/(m+n)] subframes, whereas delay occurring until inputted encoded data is outputted as voice data is [2+1/(m+n)] subframes. In consequence, delay occurring in the encoding and decoding processes totals [3+(m+1)/(m+n)] subframes [where m, n and 1 are positive real numbers, and (0≦1<n)], which means that the delay can be largely decreased as compared with the general technique.

(b) Description of a Second Embodiment

Figure 3:
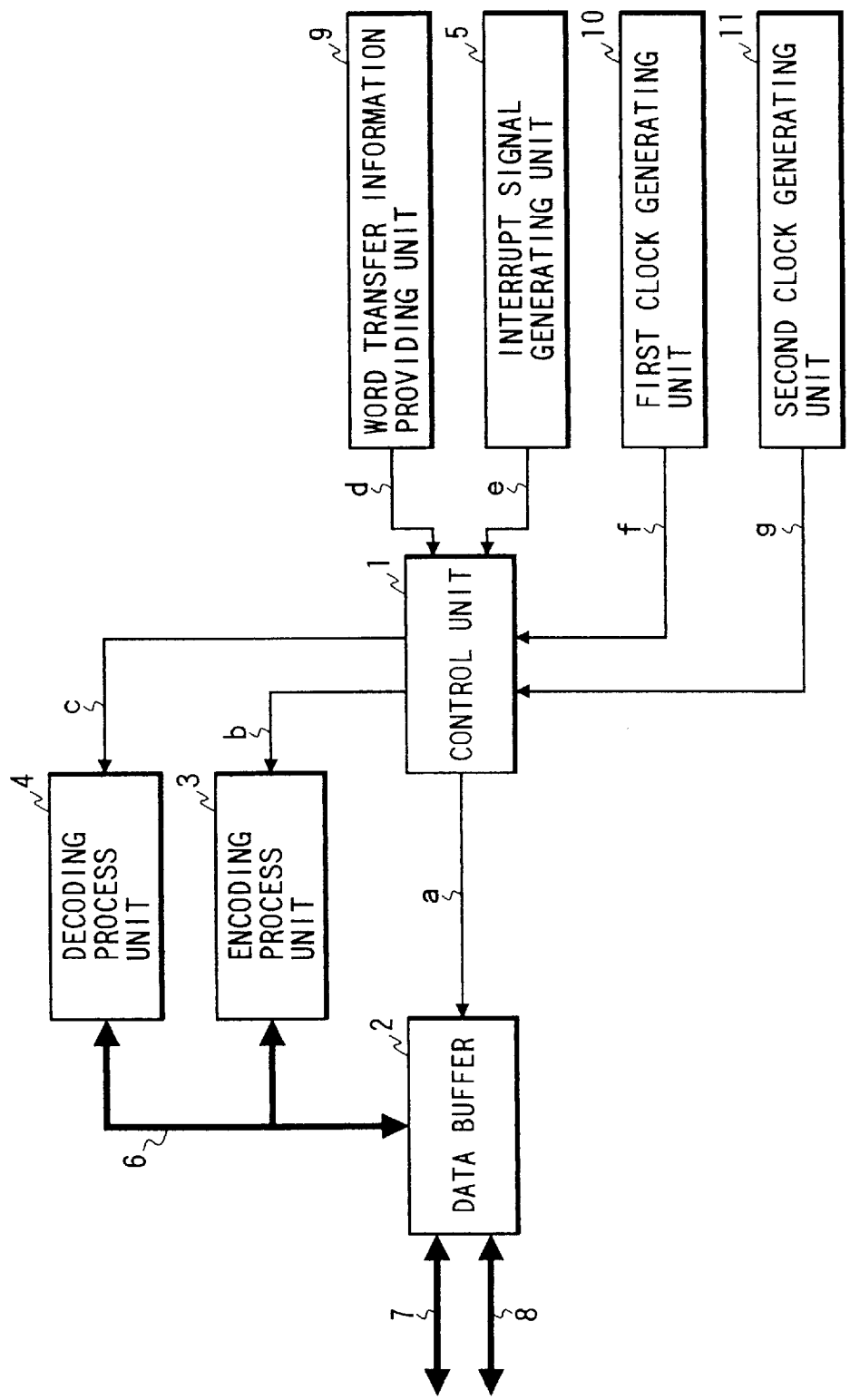
FIG. 3 is a block diagram showing a structure of a voice encoding/decoding apparatus according to a second embodiment of this invention.

FIG. 3 is a block diagram of a voice encoding/decoding apparatus according to a second embodiment of this invention. Incidentally, like reference characters in FIG. 1 designate like or corresponding parts in FIG. 3. In FIG. 3, 1 denotes a control unit, 2 a data buffer, 3 an encoding process unit, 4 a decoding process unit, 5 an interrupt signal generating unit, 6 a data bus, 7 a first I/O port, 8 a second I/O port, 9 a word transfer information providing unit, 10 a first clock generating unit, and 11 a second clock generating unit. Further, a denotes a data control signal, b an encoding process start signal, c a decoding process start signal, d word transfer information, e an interrupt signal, f a first clock signal, and g a second clock signal. The voice encoding/decoding apparatus with the above structure according to the second embodiment operates as follows.

According to this embodiment, a frame is divided into plural subframes (four subframes in this case), and data of one subframe is inputted and outputted as a unit in an encoding process and in a decoding process when inputted voice data is encoded and outputted as encoded data or inputted encoded data is decoded and outputted as voice data. The word transfer information providing unit 9 is set therein in advance the number of words contained in one subframe to be processed at a time and respective input/output transfer starting addresses of voice data and encoded data, and sends out the number of words and the addresses as the word transfer information d to the control unit 1.

First, an encoding process will be described. The control unit 1 counts the number of times voice data is inputted and outputted, outputs the encoding process start signal b to the encoding process unit 3 when the count number reaches the number of words designated in the word transfer information d to reset the count number, and continuously commences again the counting. The encoding process unit 3 encodes the voice data of one subframe when receiving the encoding process start signal b. The voice data equivalent to the words contained in one subframe to be processed stored at the voice data input transfer starting address and the following addresses is sent out from the data buffer 2 to the encoding process unit 3 via the data bus 6 according to the control signal a fed from the control unit 1. The encoding process unit 3 encodes the voice data of one subframe, outputs encoded data equivalent to the words contained in one subframe having been encoded in the encoding process to the data buffer 2 through the data bus 6, and stores the encoded data at the encoded data output transfer starting address and the following addresses in the data buffer 2 according to the control signal a fed from the control unit 1. The subframe encoding process conducted when an interruption occurs is given a number (cod1), as shown FIG. 4. A synch bit is added to the encoded data only when the interruption occurs. After that, the encoding process succeeds in the order of (cod2), (cod3), (cod4), (cod1), . . . (cod4), repeatedly.

Figure 4:
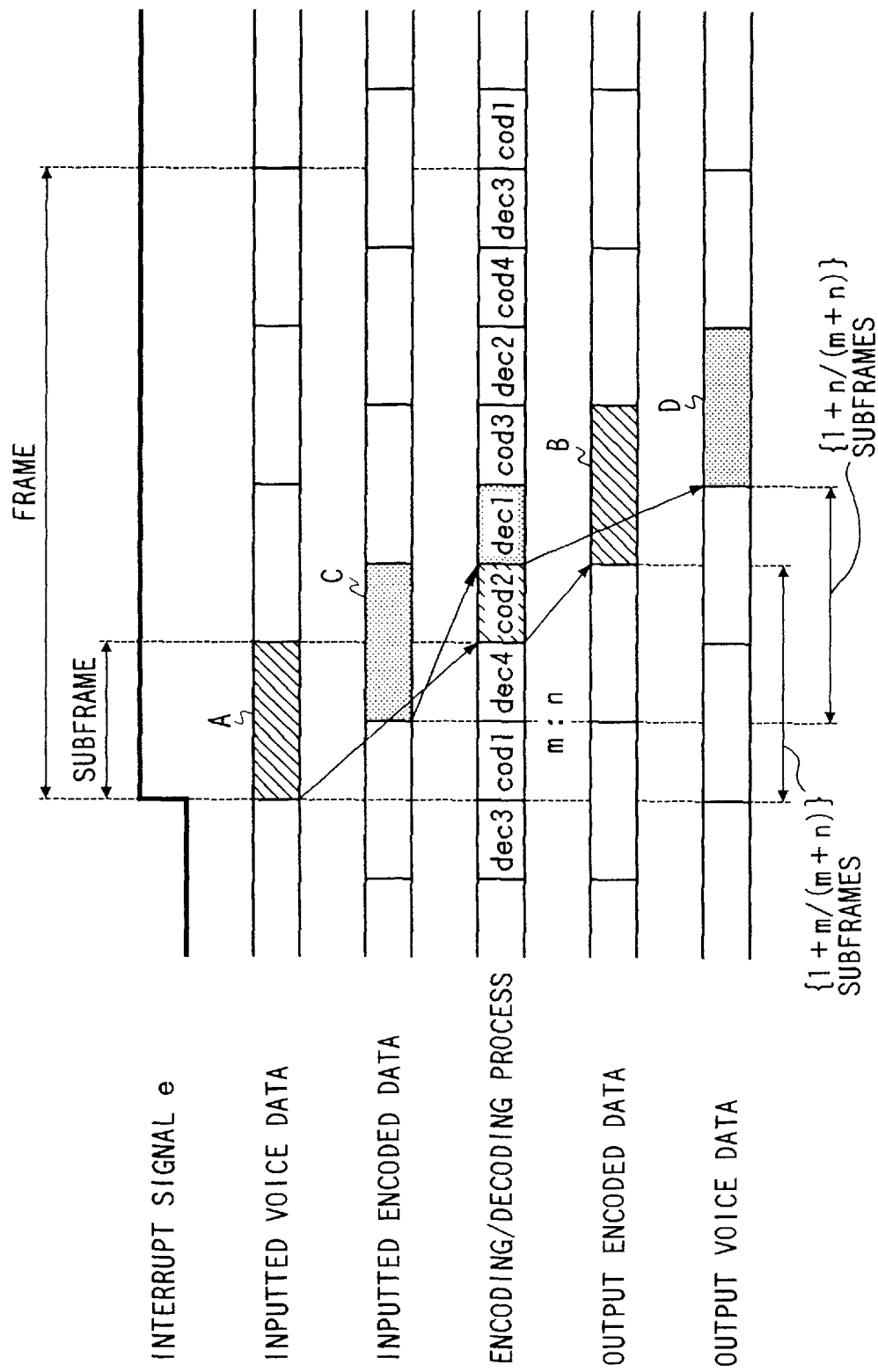
FIG. 4 is a timing chart of the voice encoding/decoding apparatus according to the second embodiment.

Next, a decoding process will be described. The control unit 1 counts the number of times encoded data is inputted and outputted, outputs the decoding process start signal c to the encoding process unit 4 when the count number reaches the number of words designated in the word transfer information d, and resets the count number to continuously commence again the counting. The decoding unit 4 decodes the encoded data of one subframe when receiving the decoding process start signal c. The encoded data equivalent to the words contained in one subframe is sent out with data stored at the encoded data input transfer starting address in the lead from the data buffer 2 to the decoding process unit 4 via the data bus 6 according to the control signal a fed from the control unit 1. The decoding process unit 4 decodes the encoded data of one subframe, outputs decoded voice data equivalent to the words contained in one subframe obtained in the decoding process to the data buffer 2 via the data bus 6, and stores the decoded voice data at the voice data output transfer starting address and the following addresses according to the control signal a fed from the control unit 1. The subframe decoding process conducted when an interruption occurs is given a number (dec4), as shown in FIG. 4. The decoding process succeeds in the order of (dec1), (dec2), (dec3), (dec4), . . . (dec3), repeatedly.

In the voice encoding/decoding apparatus according to the second embodiment, the data is inputted and outputted as follows. Voice data is successively inputted by word at timing of the first clock signal f fed from the first clock generating unit 10 to the data buffer 2 via the first I/O port 7 according to the control signal a fed from the control unit 1, and stored at the voice data input transfer starting address and following addresses in the data buffer 2. At the same time, the voice data is successively outputted with data stored at the voice data output transfer starting address in the lead from the data buffer 2 to the outside via the first I/O port 7 at timing of the first clock signal f according to the control signal a fed from the control unit 1. When the voice data equivalent to the words in one subframe is completed to be inputted (or outputted), the voice data input transfer starting address (or the voice data output transfer starting address) is again designated as an address to be accessed next by the control signal a fed from the control. On the other hand, encoded data is successively inputted by word at timing of the second clock signal g fed from the second clock generating unit 11 to the data buffer 2 via the second I/O port 8, and stored at the encoded data input transfer starting address and following addresses in the data buffer 2. At the same time, the encoded data is successively outputted by word with data stored at the encoded data output transfer starting address in the lead at timing of the second clock signal g according to the control signal a fed from the control unit 1 from the data buffer 2 to the outside via the second I/O port 8. When the encoded data equivalent to the words in one subframe is completed to be inputted (or outputted), the encoded data input transfer starting address (or the encoded data output transfer starting address) is again designated as an address to be accessed next by the control signal a.

FIG. 4 is a timing chart of the voice encoding/decoding apparatus shown in FIG. 3. Timing of an operation of the voice encoding/decoding apparatus shown in FIG. 3 will be described next with reference to FIG. 4. First, the encoding process will be described. Inputted voice data A of one subframe obtained immediately after a rising of the interrupt signal e is inputted to the data buffer 2. The inputted voice data A is encoded during the next subframe cycle (cod2) following a subframe cycle generated when an interruption occurs, and encoded data is sequentially outputted to the data buffer 2. The encoded data held in the data buffer 2 is outputted as output encoded data B during a decoding process (dec1) immediately after the encoding process (cod2) and the next encoding process (cod3).

Next, a decoding process will be described. Inputted encoded data C of one subframe obtained immediately after a rising of the interrupt signal e is inputted as encoded data to the data buffer 2. The inputted encoded data C is decoded in the decoding process (dec1) in the next subframe cycle. Incidentally, the decoding process conducted immediately after occurrence of the interruption is given a number (dec4). Voice data obtained by decoding the inputted encoded data in the decoding process (dec1) is successively outputted to the data buffer 2. The voice data held in the data buffer 2 is outputted as output voice data D to the outside during an encoding process (cod3) immediately after (dec1) and the next decoding process (dec2).

According to the second embodiment, if a time ratio of the encoding process to the decoding process conducted on one subframe is m:n, delay occurring until inputted voice data is outputted as encoded data is $[(1+n)/(m+n)]$ subframes (where m and n are positive real numbers), whereas delay occurring until inputted encoded data is outputted as voice data is $[1+n/(m+n)]$ subframes (where m and n are positive real numbers). Therefore, delay occurring in the encoding and decoding processes totals 3 subframes so that the delay can be largely decreased as compared with the general technique.

(c) Description of a Third Embodiment

Figure 5:
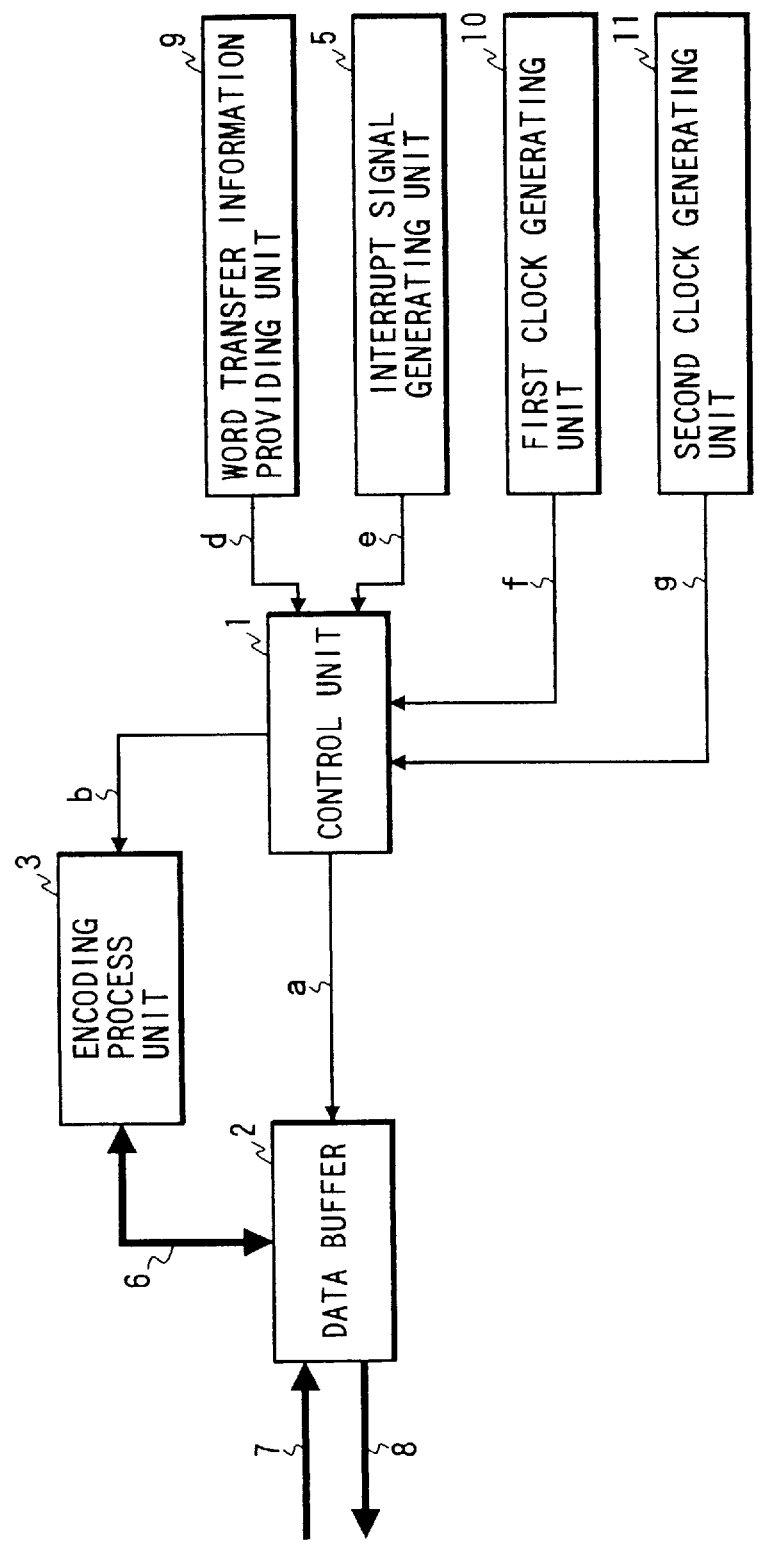
FIG. 5 is a block diagram showing a structure of a voice encoding apparatus according to a third embodiment of this invention.

FIG. 5 is a block diagram of a voice encoding apparatus according to a third embodiment of this invention. Incidentally, like reference characters in FIG. 1 designate like or corresponding parts in FIG. 5. In FIG. 5, reference numeral 1 denotes a control unit, 2 a data buffer, 3 an encoding processing unit, 5 an interrupt signal generating unit, 6 a data bus, 7 a first I/O port, 8 a second I/O port, 9 a word transfer information providing unit, 10 a first clock generating unit, and 11 a second clock generating unit. Further, a designates a data control signal, b an encoding process start signal, d word transfer information, e an interrupt signal, f a first clock signal, and g a second clock signal. Hereinafter, an operation of the voice encoding apparatus with the above structure will be described.

According to this embodiment, a frame is divided into plural subframes (four subframes in this case), and inputted voice data is inputted and outputted by subframe as a unit in an encoding process when the data is encoded and outputted as encoded data. The word transfer information providing unit 9 is set in advance therein the number of words contained in one subframe to be processed at a time, a voice data input transfer starting address and an encoded data input transfer starting address, and sends out the number of words and the addresses as the word transfer information d to the control unit 1.

Figure 6:
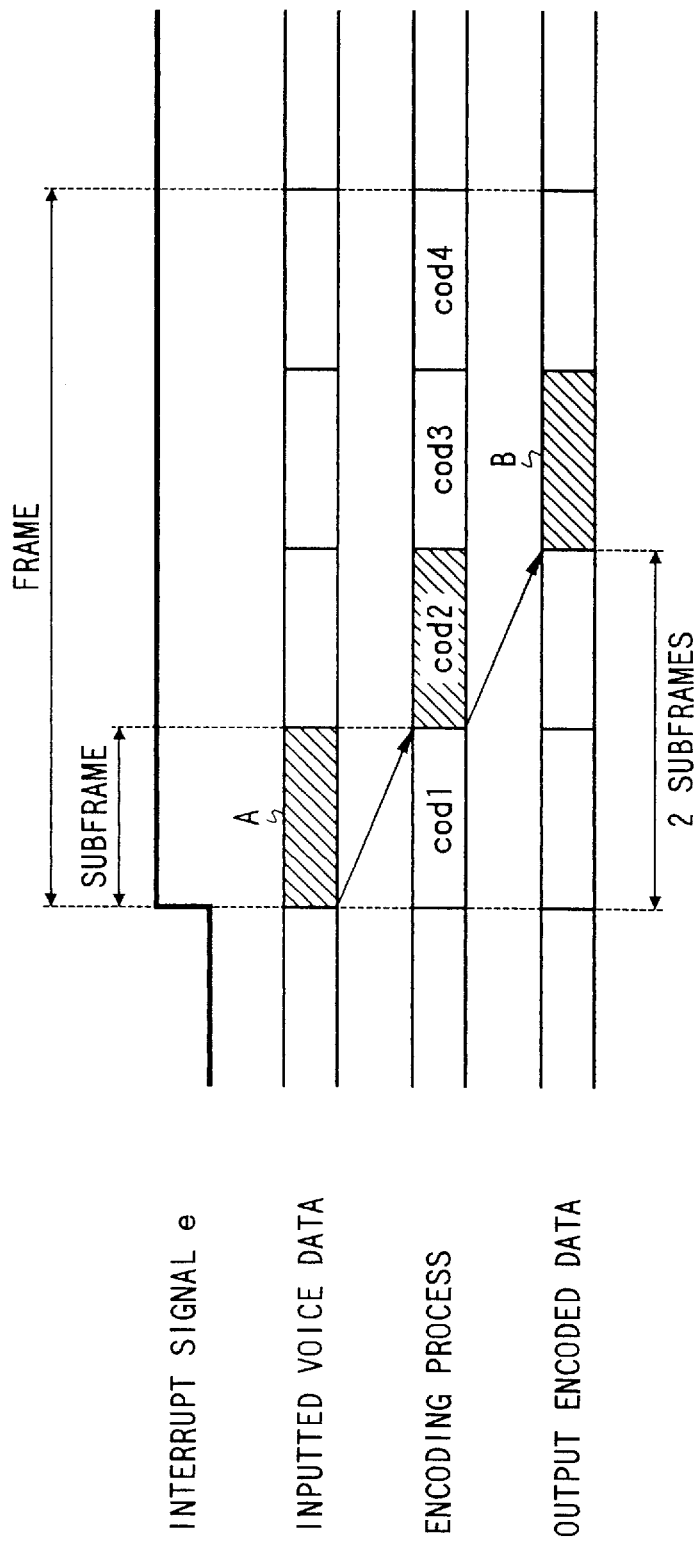
FIG. 6 is a timing chart of the voice encoding apparatus according to the third embodiment.

The control unit 1 counts the number of times voice data is inputted and outputted, outputs the encoded process start signal b to the encoding process unit 3 when the count number reaches the number of words designated in the word transfer information d, and resets the count number to continuously commence again the counting. The encoding process unit 3 processes the voice data of one subframe when receiving the encoding process start signal b. More specifically, voice data in number equivalent to the words contained in one subframe stored at the voice data input transfer starting address and the following addresses is outputted to the encoding process unit 3 via the data bus 6 from the data buffer 2 according to the control signal a fed from the control unit 1. The encoding process unit 3 encodes the voice data of one subframe, outputs encoded data of one subframe obtained by encoding the voice data in the encoding process to the data buffer 2 via the data bus 6, and stores the encoded data at the encoded data output transfer starting address and the following addresses in the data buffer 2 according to the control signal a fed from the control unit 1. The subframe encoding process conducted when an interruption occurs is given a number (cod1), as shown in FIG. 6. Only when the interruption occurs, a synch bit is added to the encoded data. The encoding process succeeds in the order of (cod2), (cod3), (cod4), (cod1), . . . , (cod4), repeatedly.

In the voice encoding apparatus shown in FIG. 5, the data is inputted and outputted as follows. Voice data is successively inputted by word with data to be stored at the voice data input transfer starting address in the lead at timing of the first clock signal f fed from the first clock generating unit 10 according to the control signal a fed from the control unit 1 to the data buffer 2 via the first I/O port 7. When the voice data equivalent to the words contained in one subframe is completed to be inputted (or outputted), the voice data input transfer starting address is again designated as an address to be accessed next by the control signal a. On the other hand, encoded data is successively outputted by word with data stored at the encoded data output transfer starting address in the lead at timing of the second clock signal g fed from the second clock generating unit 11 from the data buffer 2 to the outside via the second I/O port 8 according to the control signal a fed from the control unit 1. When the encoded data equivalent to the words in one subframe is completed to be outputted, the encoded data output transfer starting address is again designated as an address to be accessed next by the control signal a.

FIG. 6 is a timing chart of the voice encoded apparatus shown in FIG. 5. Hereinafter, timing of an operation of the voice encoding apparatus shown in FIG. 5 will be described with reference to FIG. 6. Inputted voice data A of one subframe obtained immediately after a rising of the interrupt signal e is inputted to the data buffer 2. The inputted voice data A is encoded during a subframe cycle of an encoding process (cod2) following a subframe cycle (cod1) conducted when an interruption occurs, and sequentially outputted as encoded data to the data buffer 2. The encoded data held in the data buffer 2 is outputted as output encoded data B to the outside during the next encoding process (cod3).

According to the third embodiment of this invention, delay occurring until inputted voice data is outputted as encoded data is 2 subframes so that it is possible to largely decrease the delay as compared with the general technique.

(d) Description of a Fourth Embodiment

Figure 7:
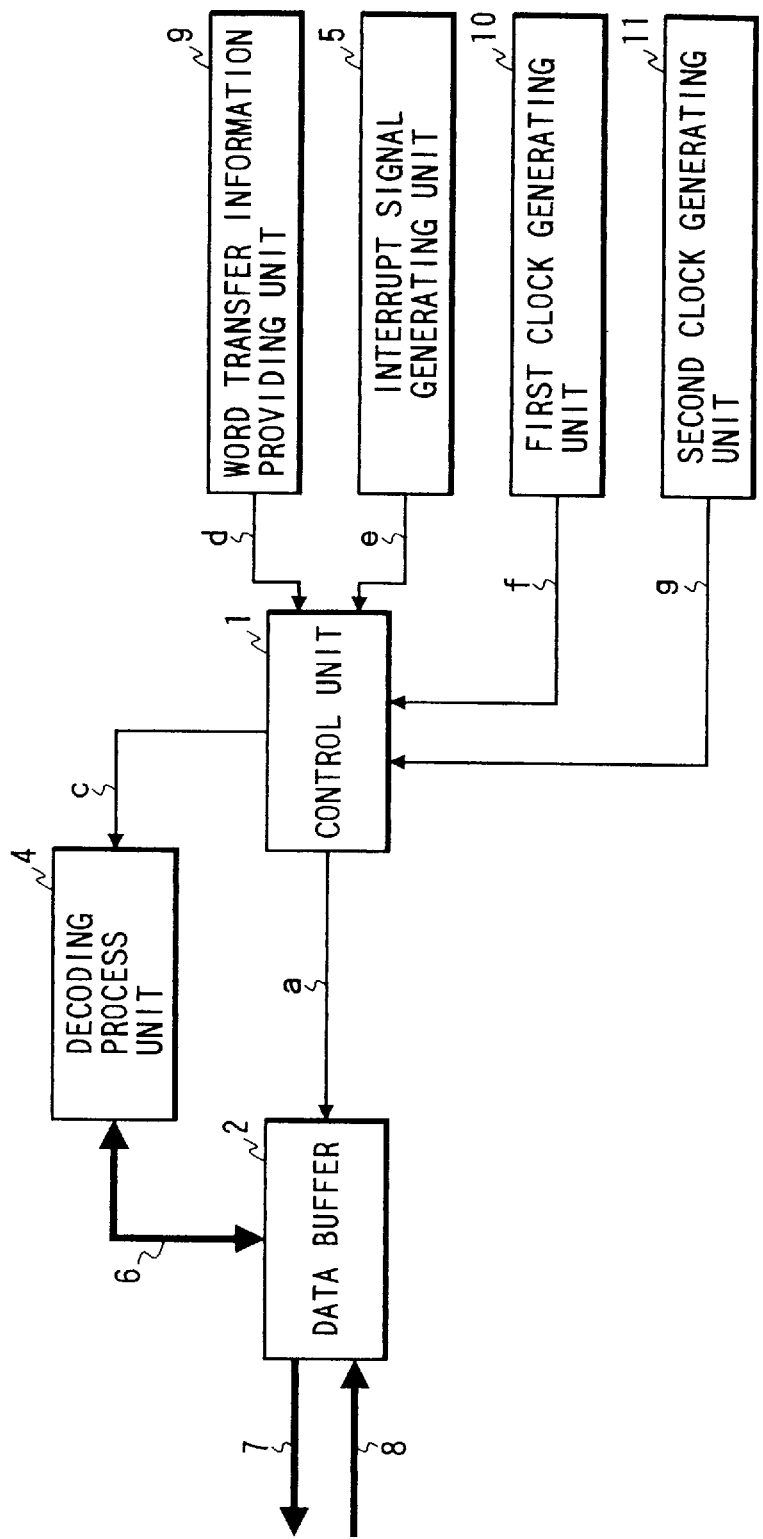
FIG. 7 is a block diagram showing a structure of a voice decoding apparatus according to a fourth embodiment of this invention.

FIG. 7 is a block diagram of a voice decoding apparatus according to a fourth embodiment of this invention. Incidentally, like reference characters in FIG. 1 designate like or corresponding parts in FIG. 7. In FIG. 7, reference numeral 1 denotes a control unit, 2 a data buffer, 4 a decoding process unit, 5 an interrupt signal generating unit, 6 a data bus, 7 a first I/O port, 8 a second I/O port, 9 a word transfer information providing unit, 10 a first clock generating unit, and 11 a second clock generating unit. Further, a denotes a data control signal, c a decoding process start signal, d word transfer information, e an interrupt signal, f a first clock signal, and g a second clock signal. Now, an operation of the voice decoding apparatus with the above structure will be described.

According to this embodiment, a frame is divided into plural subframes (four subframes in this case), and inputted coded data is inputted and outputted by subframe to be processed at a time when being decoded and outputted as voice data. The word transfer information providing unit 9 is set in advance therein the number of words contained in one subframe to be processed at a time, a voice data output transfer starting address, and an encoded data input transfer starting address, and sends out the number of words and the addresses as the word transfer information d to the control unit 1.

Figure 8:
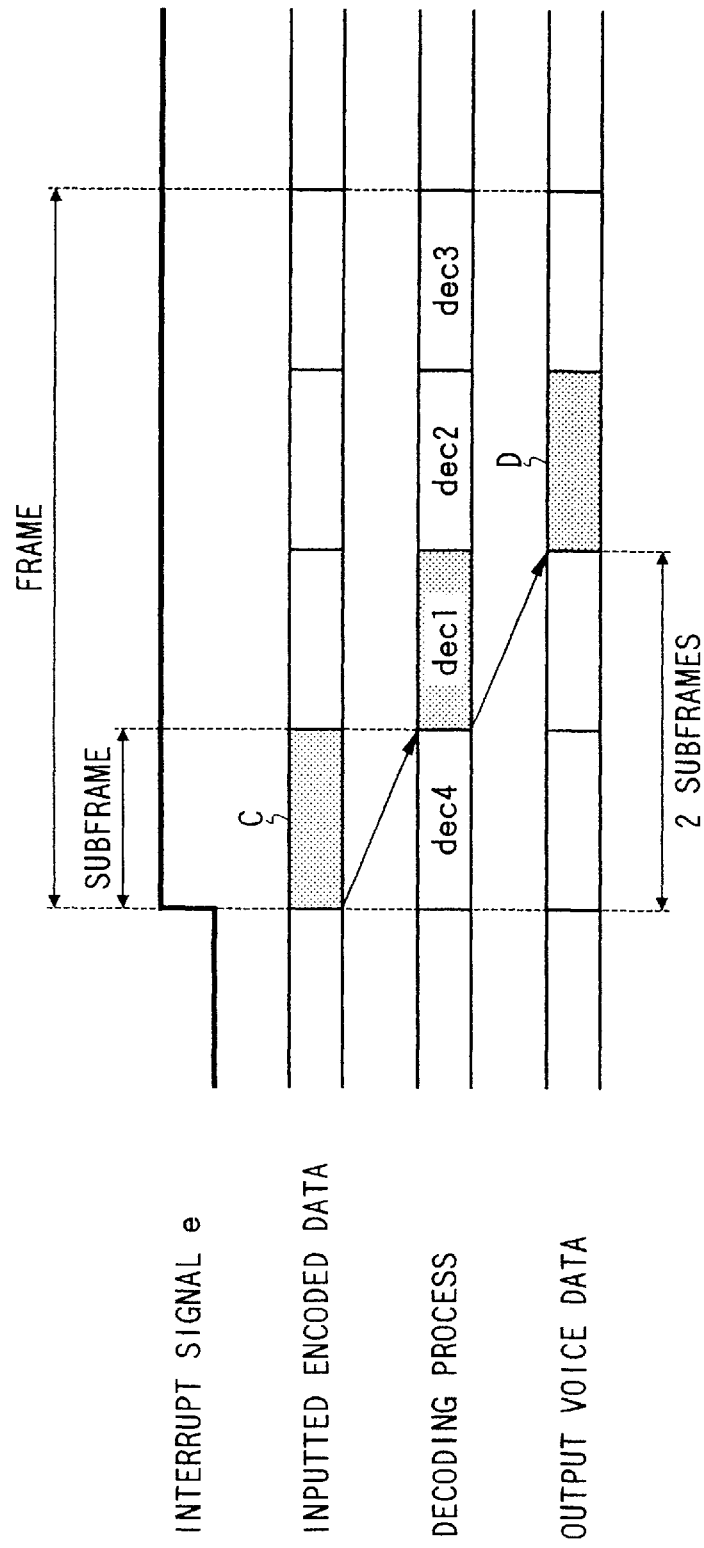
FIG. 8 is a timing chart of the voice decoding apparatus according to the fourth embodiment.

The control unit 1 counts the number of times encoded data is inputted and outputted, outputs the decoding process start signal c to the decoding process unit 4 when the count number reaches the number of words designated in the word transfer information d, and resets the count number to continuously commence again the counting. The decoding process unit 4 starts decoding the encoded data of one subframe when receiving the decoding process start signal c. More specifically, the encoded data equivalent to the words contained in one subframe is inputted with data stored at the encoded data input transfer starting address in the lead from the data buffer 2 to the decoding process unit 4 via the data bus 6 according to the control signal a fed from the control unit 1. The decoding process unit 4 decodes the encoded data of one subframe, outputs decoded voice data equivalent to the words in one subframe obtained by decoding the encoded data in the decoding process to the data buffer 2 via the data bus 6, and stores the decoded voice data at the voice data output transfer starting address and the following addresses in the data buffer 2 according to the control signal a fed from the control unit 1. The subframe decoding process conducted when in interruption occurs is given a number (doc4), as shown in FIG. 8. After that, the decoding process succeeds in the order (dec1), (dec2), (dec3), (dec4), . . . (dec3), repeatedly.

In the voice decoding apparatus shown in FIG. 7, the data is inputted and outputted as follows. Voice data is successively outputted by word with data stored at the voice data output transfer starting address in the lead at timing of the first clock signal f generated by the first clock signal generating unit 10 from the data buffer 2 to the outside via the first I/O port 7 according to the control signal a fed from the control unit 1. When the voice data equivalent to the words in one subframe is completed to be outputted, the voice data output transfer starting address is again designated as an address to be accessed next by the control signal a. On the other hand, encoded data is successively inputted to the data buffer 2 via the second I/O port 8 at timing of the second clock signal g generated by the second clock signal generating unit 11, and stored at the encoded data input transfer starting address and the following addresses according to the control signal a fed from the control unit 1. When the encoded data equivalent to the words contained in one subframe is completed to be inputted, the encoded data input transfer starting address is again designated as an address to be accessed next by the control signal a.

FIG. 8 is a timing chart of the voice decoding apparatus shown in FIG. 7. Timing of an operation of the voice decoding apparatus shown in FIG. 7 will be now described with reference to FIG. 8. Inputted encoded data C of one subframe obtained immediately after a rising of the interrupt signal e is inputted as encoded data of one subframe to the data buffer 2. The inputted encoded data is decoded during the next subframe cycle (dec1) generated after occurrence of the interruption by a necessity of keeping the synchronization. Incidentally, a decoding process conducted when the interruption occurs is given a number (dec4). Voice data obtained in the decoding process (dec1) is successively outputted to the data buffer 2. The voice data held in the data buffer 2 is outputted as output voice data D during the next decoding process (dec2).

According to this embodiment, a delay occurring until inputted encoded data is outputted as voice data is 2 subframes so that it is possible to largely decrease a delay as compared with the general technique.

(e) Description of a Fifth Embodiment

Figure 9:
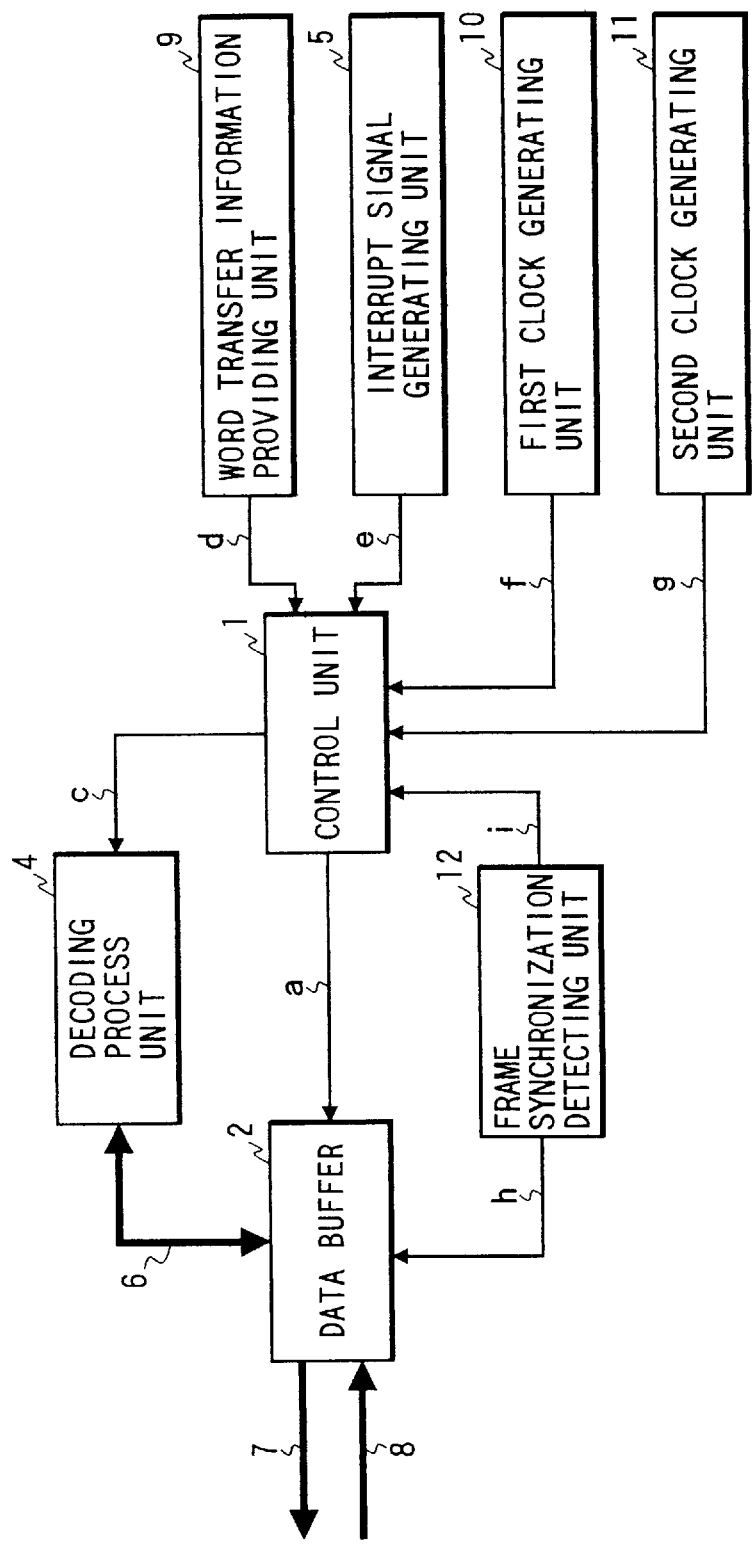
FIG. 9 is a block diagram showing a structure of a voice decoding apparatus according to a fifth embodiment of this invention.

FIG. 9 is a block diagram of a voice decoding apparatus according to a fifth embodiment of this invention. Incidentally, like reference characters in FIG. 1 designate like or corresponding parts in FIG. 9. In FIG. 9, reference numeral 1 denotes a control unit, 2 a data buffer, 4 a decoding process unit, 5 an interrupt signal generating unit, 6 a data bus, 7 a first I/O port, 8 a second I/O port, 9 a word transfer information providing unit, 10 a first clock generating unit, 11 a second clock generating unit, and 12 a frame synchronization detecting unit. Further, a designates a data control signal, c a decoding process start signal, d word transfer information, e an interrupt signal, f a first clock signal, g a second clock signal, h a synch bit retrieve signal, and i synch bit position information. An operation of the voice decoding apparatus with the above structure will be next described.

According to this embodiment, a frame is divided into plural subframes (four subframes in this case), and inputted encoded data is inputted and outputted by subframe as a unit to be processed at a time when being decoded and outputted as voice data. The word transfer information providing unit 9 is set in advance therein the number of words contained in one subframe to be processed at a time, a voice data output transfer starting address, and an encoded data input transfer starting address, and sends out the number of words and the addresses as the word transfer information d to the control unit 1.

Figure 10:
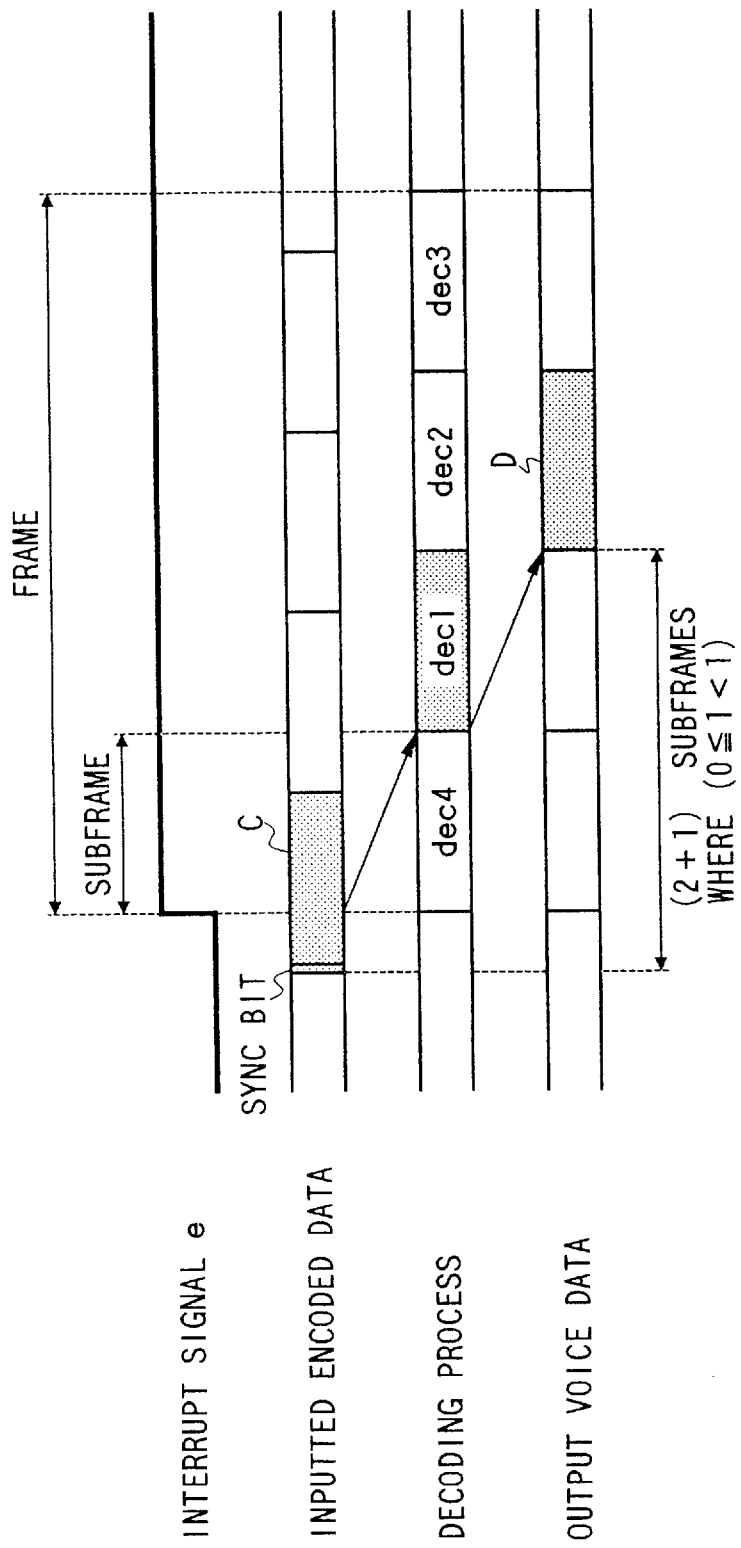
FIG. 10 is a timing chart of the voice decoding apparatus according to the fifth embodiment.

The frame synchronization detecting unit 12 outputs the synch bit retrieve signal h to the data buffer 2 to detect a synch bit in encoded data held in the data buffer 2, and outputs the synch bit position information i to the control unit 1. The control unit 1 selects a time to commence a decoding process on a subframe conducted at the time of occurrence of an interruption on the basis of the synch bit position information i such that delay occurring in a decoding process is minimum, and re-arranges inputted encoded data such that the synch bit is at the encoded data input transfer starting encoded data address. The control unit 1 counts the number of times the encoded data is inputted and outputted, outputs the decoded process start signal c to the decoding process unit 4 when the count number reaches the number of words designated in the word transfer information d, and resets the count number to commence again the counting, continuously. The decoding process unit 4 starts decoding the encoded data of one subframe when receiving the decoding process start signal c. More specifically, the encoded data equivalent to the words contained in one subframe stored at the encoded data input transfer starting address and the following addresses is outputted from the data buffer 2 to the decoding process unit 4 via the data bus 6 according to the control signal a fed from the control unit 1. The decoding process unit 4 decodes the encoded data of one subframe. Decoded voice data equivalent to the words in one subframe obtained by decoding the encoded data in the decoding process is outputted from the decoding process unit 4 to the data buffer 2 via the data bus 6, and stored at the voice data output transfer starting address and the following addresses in the data buffer 2 according to the control signal a fed from the control unit 1. The data to which the synch bit is added is processed during (dec1), as shown in FIG. 10. After that, the decoding process succeeds in the order of (dec2), (dec3), (dec4), (dec1), . . . , (dec4), repeatedly. A time to commence the decoding process on a subframe conducted when the interruption occurs is such selected that delay occurring in the decoding process is minimum according to a position of the synch bit. Accordingly, a time to commence the subframe decoding process is independent of occurrence of the interruption.

In the voice decoding apparatus shown in FIG. 9, the data is inputting and outputting as follows. Voice data is successively outputted by word with data stored at the voice data output transfer starting address in the lead at timing of the first clock signal f generated by the first clock generating unit 10 from the data buffer 2 to the outside via the first I/O port 7 according to the control signal a fed from the control unit 1. When the voice data equivalent to the words in one subframe is completed to be outputted, the output start voice data output transfer starting address is again designated as an address to be accessed next by the control signal a. On the other hand, encoded data is successively inputted by word with data to be stored at the encoded data input transfer starting address in the lead at timing of the second clock signal g generated by the second clock generating unit 11 to the data buffer 2 via the second I/O port 8 according to the control signal a fed from the control unit 1. When the encoded data equivalent to the words in one subframe is completed to be inputted, the encoded data input transfer starting address is again designated as an address to be accessed next by the control signal a.

FIG. 10 is a timing chart of the voice decoding apparatus shown in FIG. 9. Timing of an operation of the voice decoding apparatus shown in FIG. 9 will be next described with reference to FIG. 10. If a synch bit is at a position as shown in FIG. 10, inputted encoded data C of one subframe is inputted with the synch bit in the lead to the data buffer 2. The encoded data is decoded in the next subframe cycle (dec1) during which the data added the synch bit thereto is processed since it is impossible to catch a subframe cycle generated when the interruption occurs. Incidentally, a decoding process conducted the interruption occurs is given a number (dec4). Voice data obtained by decoding the encoded data during (dec1) is sequentially outputted to the data buffer 2. The voice data held in the data buffer 2 is outputted as output voice data D to the outside during the next decoding process (dec2).

According to the fifth embodiment, delay occurring until inputted encoded data is outputted as voice data is (2+1) subframes [where 1 is a positive real number, and $(0 \leq 1 < 1)$]

so that it is possible to large decreased a delay as compared with the general technique.

What is claimed is:

1. A voice encoding/decoding apparatus for encoding inputted voice data and outputting said voice data as encoded data, while decoding inputted encoded data and outputting said encoded data as voice data comprising:

a data buffer for holding voice data inputted and outputted through an I/O port and encoded data inputted and outputted through another I/O port;

a voice encoding means receiving said voice data of one subframe from said data buffer to encode said voice data to obtain encoded data and outputting said encoded data of one subframe to said data buffer;

a voice decoding means receiving said encoded data of one subframe from said data buffer to decode said encoded data to obtain voice data and outputting said voice data of one subframe to said data buffer;

a frame synchronization detecting means for detecting a position of a synch bit attached to said encoded data held in said data buffer;

a first clock generating means for providing timing of inputting and outputting said voice data to and from said data buffer;

a second clock generating means for providing timing of inputting and outputting said encoded data to and from said data buffer;

a word transfer information providing means for providing the number of words of said voice data to be inputted to and outputted from said data buffer, the number of words of said encoded data to be inputted to and outputted from said data buffer, information about a position of said voice data in said data buffer, and information about a position of said encoded data in said data buffer; and a control means for minimizing a time required from an inputting of said voice data to an outputting of said encoded data upon encoding said voice data of each subframe and a time required from an inputting of said encoded data to an outputting of said voice data upon decoding said encoded data of each subframe on the basis of said number of words of said voice data, said number of words of said encoded data, said information about a position of said voice data in said data buffer and said information about a position of said encoded data in said data buffer provided by said word transfer information providing means.

2. A voice encoding/decoding apparatus for encoding inputted voice data and outputting said voice data as encoded data, while decoding inputted encoded data and outputting said encoded data as voice data comprising:

a data buffer for holding voice data inputted and outputted through an I/O port and encoded data inputted and outputted through another I/O port;

a voice encoding means receiving said voice data of one subframe from said data buffer to encode said voice data to obtain encoded data and outputting said encoded data of one subframe to said data buffer;

a voice decoding means receiving said encoded data of one subframe from said data buffer to decode said encoded data to obtain voice data and outputting said voice data of one subframe to said data buffer;

a first clock generating means for providing timing of inputting and outputting said voice data to and from said data buffer;

a second clock generating means for providing timing of inputting and outputting said encoded data to and from said data buffer;

a word transfer information providing means for providing the number of words of said voice data to be inputted to and outputted from said data buffer, the number of words of said encoded data to be inputted to and outputted from said data buffer, information about a position of said voice data in said data buffer, and information about a position of said encoded data in said data buffer; and a control means for minimizing a time required from an inputting of said voice data to an outputting of said encoded data upon encoding said voice data of each subframe and a time required from an inputting of said encoded data to an outputting of said voice data upon decoding said encoded data of each subframe on the basis of said number of words of said voice data, said number of words of said encoded data, said information about a position of said voice data in said data buffer and said information about a position of said encoded data in said data buffer provided by said word transfer information providing means.

3. A voice encoding apparatus for encoding inputted voice data and outputting said voice data as encoded data comprising:

a data buffer for holding voice data inputted through an I/O port and encoded data to be outputted through another I/O port;

a voice encoding means receiving said voice data of one subframe from said data buffer to encode said voice data to obtain encoded data and outputting said encoded data of one subframe to said data buffer;

a first clock generating means for providing timing of inputting said voice data to said data buffer;

a second clock generating means for providing timing of outputting said encoded data from said data buffer;

a word transfer information providing means for providing the number of words of said voice data to be inputted to said data buffer, the number of words of said encoded data to be outputted from said data buffer, information about a position of said voice data in said data buffer and information about a position of said encoded data in said data buffer; and a control means for minimizing a time required from an inputting of said voice data and an outputting of said encoded data upon encoding said voice data of each subframe on the basis of said number of words of said voice data, said number of words of said encoded data, said information about a position of said voice data in said data buffer and information about a position of said encoded data in said data buffer provided by said word transfer information providing means.

4. A voice decoding apparatus for decoding inputted encoded data and outputting said encoded data as voice data comprising:

a data buffer for holding voice data to be outputted through an I/O port and encoded data inputted through another I/O port;

a voice decoding means receiving said encoded data of one subframe from said data buffer to decode said encoded data of one subframe to obtain said voice data and outputting said voice data of one subframe to said data buffer;

a first clock generating means for providing timing of outputting said voice data from said data buffer;

a second clock generating means for proving timing of inputting said encoded data to said data buffer;

a word transfer information providing means for providing the number of words of said voice data to be outputted from said data buffer, the number of words of said encoded data to be inputted to said data buffer, information about a position of said voice data in said data buffer and information about a position of said encoded data in said data buffer; and a control means for minimizing a time required from an inputting of said encoded data to an outputting of said voice data upon decoding said encoded data of each subframe on the basis of said number of words of said voice data, said number of words of said encoded data, said information about a position of said voice data in said data buffer and said information about a position of said encoded data in said data buffer provided by said word transfer information providing means.

5. A voice decoding apparatus for decoding inputted encoded data and outputting said encoded data as voice data comprising:

a data buffer for holding voice data to be outputted through an I/O port and encoded data inputted through another I/O port;

a voice decoding means receiving said encoded data of one subframe from said data buffer to decode said encoded data to obtain said voice data and outputting said voice data of one subframe to said data buffer;

a frame synchronization detecting means for detecting a position of a synch bit in said encoded data held in said data buffer;

a first clock generating means for providing timing of outputting said voice data from said data buffer;

a second clock generating means for providing timing of inputting said encoded data to said data buffer;

a word transfer information providing means for providing the number of words of said voice data to be outputted from said data buffer, the number of words of said encoded data to be inputted to said data buffer, information about a position of said voice data in said data buffer and information about a position of said encoded data in said data buffer; and a control means for minimizing a time required from an inputting of said encoded data to an outputting of said voice data upon decoding said voice data of each subframe on the basis of said number of words of said voice data, said number of words of said encoded data, said information about a position of said voice data in said data buffer and said information about a position of said encoded data in said data buffer provided by said word transfer information providing means.

* * * * *